(12) United States Patent
Miller et al.

(10) Patent No.: US 10,034,407 B2
(45) Date of Patent: Jul. 24, 2018

(54) STORAGE SLED FOR A DATA CENTER

(71) Applicant: INTEL CORPORATION, Santa Clara, CA (US)

(72) Inventors: Steven C. Miller, Livermore, CA (US); Michael Crocker, Portland, OR (US); Aaron Gorius, Upton, MA (US); Paul Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/394,392

(22) Filed: Dec. 29, 2016

(65) Prior Publication Data

US 2018/0027685 A1    Jan. 25, 2018

Related U.S. Application Data

(60) Provisional application No. 62/427,268, filed on Nov. 29, 2016, provisional application No. 62/376,859, filed on Aug. 18, 2016, provisional application No. 62/365,969, filed on Jul. 22, 2016.

(51) Int. Cl.
*H05K 7/14* (2006.01)
*G06F 13/40* (2006.01)
*H05K 5/02* (2006.01)

(52) U.S. Cl.
CPC ......... *H05K 7/1489* (2013.01); *G06F 13/409* (2013.01); *G06F 13/4068* (2013.01); *H05K 5/0204* (2013.01); *H05K 7/1498* (2013.01)

(58) Field of Classification Search
CPC combination set(s) only.
See application file for complete search history.

(56) References Cited

U.S. PATENT DOCUMENTS

| | | | |
|---|---|---|---|
| 5,652,697 A * | 7/1997 | Le | G06F 1/182 174/351 |
| 9,167,705 B2 * | 10/2015 | Kyle | G06F 1/187 |
| 9,433,119 B2 * | 8/2016 | Canfield | H05K 7/1417 |
| 9,448,599 B2 * | 9/2016 | Ehlen | G06F 1/187 |
| 9,456,519 B2 * | 9/2016 | Bailey | H05K 7/1488 |
| 2001/0001529 A1 | 5/2001 | Behl et al. | |
| 2007/0230109 A1 * | 10/2007 | Starr | G11B 33/128 361/679.31 |
| 2010/0142544 A1 | 6/2010 | Chapel et al. | |
| 2012/0020663 A1 | 1/2012 | McLaren et al. | |
| 2015/0355686 A1 | 12/2015 | Heyd et al. | |
| 2016/0286682 A1 * | 9/2016 | Canfield | H05K 7/1417 |
| 2017/0055362 A1 * | 2/2017 | Bailey | H05K 7/1488 |
| 2017/0094828 A1 * | 3/2017 | Van Pelt | H05K 7/1489 |
| 2017/0135243 A1 * | 5/2017 | Canfield | H05K 7/1489 |

FOREIGN PATENT DOCUMENTS

WO    2012113807    8/2012

OTHER PUBLICATIONS

International Search Report received for PCT Patent Application No. PCT/US2017/038660, dated Oct. 17, 2017, 5 pages.

* cited by examiner

*Primary Examiner* — Lisa Lea Edmonds
(74) *Attorney, Agent, or Firm* — Barnes & Thorburg LLP

(57) ABSTRACT

Examples may include a sled for a rack of a data center including physical storage resources. The sled comprises mounting flanges to enable robotic insertion and removal from a rack and storage device mounting slots to enable robotic insertion and removal of storage devices into the sled. The storage devices are coupled to an optical fabric through storage resource controllers and a dual-mode optical network interface.

28 Claims, 18 Drawing Sheets

STORAGE SLED FOR A DATA CENTER

RELATED APPLICATIONS

This application claims priority to: U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, all of which are hereby incorporated by reference in their entirety.

TECHNICAL FIELD

Examples described herein are generally related to data centers and particularly to storage sleds to couple physical storage resources in a data center.

BACKGROUND

Advancements in networking have enabled the rise in pools of configurable computing resources. A pool of configurable computing resources may be formed from a physical infrastructure including disaggregate physical resources, for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute and/or host system SW (e.g., OSs, VMs, Containers, Applications, or the like). The amount of data storage in data centers continues to increase, often at exponential levels, thus requiring physical storage resources in the data center. The present disclosure is directed to such physical storage resources.

DETAILED DESCRIPTION

Figure 1:
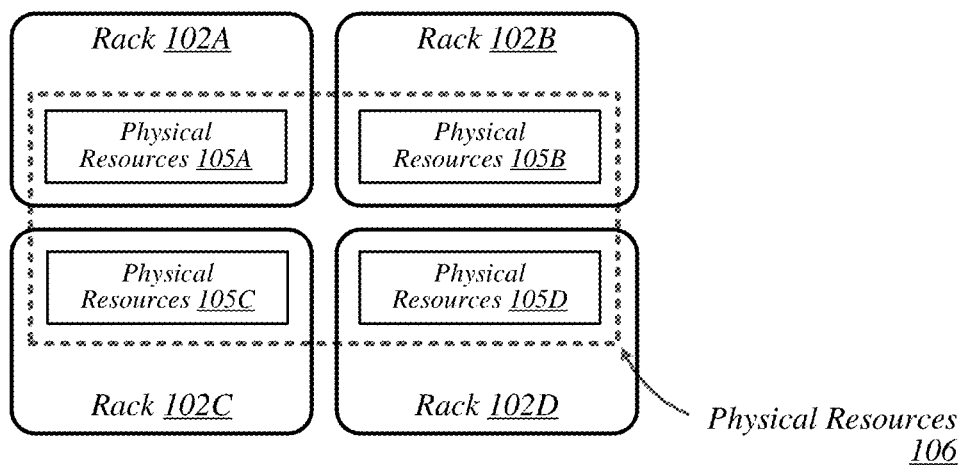
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

These physical resources are often arranged in racks within a data center. The present disclosure provides racks arranged to receive a number of sleds, where each sled can house a number of physical resources. In particular, a sled to couple a number of physical storage resources (e.g., solid-state-drives (SSDs), or the like) to a data center is described. The sled can couple to a rack using automated techniques, such as, robotic coupling or manipulation, is provided. The sled can accommodate a number of storage devices (e.g., SSDs, or the like) and can couple the storage devices to an optical fabric provided in the data center. Furthermore, the sled can accommodate automated removal and/or installation of the storage devices. More specifically, as will be described in greater detail below, the sled can accommodate robotic installation and/or removal of the storage devices.

The sled can include a dual-mode optical network interface operable to couple to the storage devices on the sled (e.g., based on electrical signaling) and couple to an optical fabric in the data center (e.g., based on optical signaling). This, and other features of the present disclosure will be described in greater detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in this figure, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
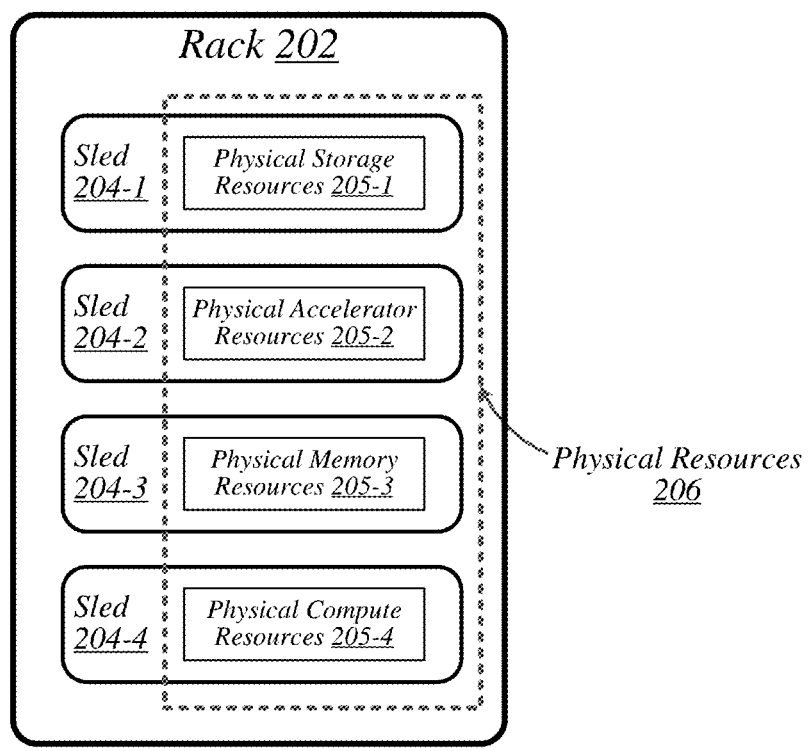
FIG. 2 illustrates a first example rack of a data center.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies. FIG. 2 illustrates an exemplary logical configuration of a rack 202 of the data center 100. As shown in this figure, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-4 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
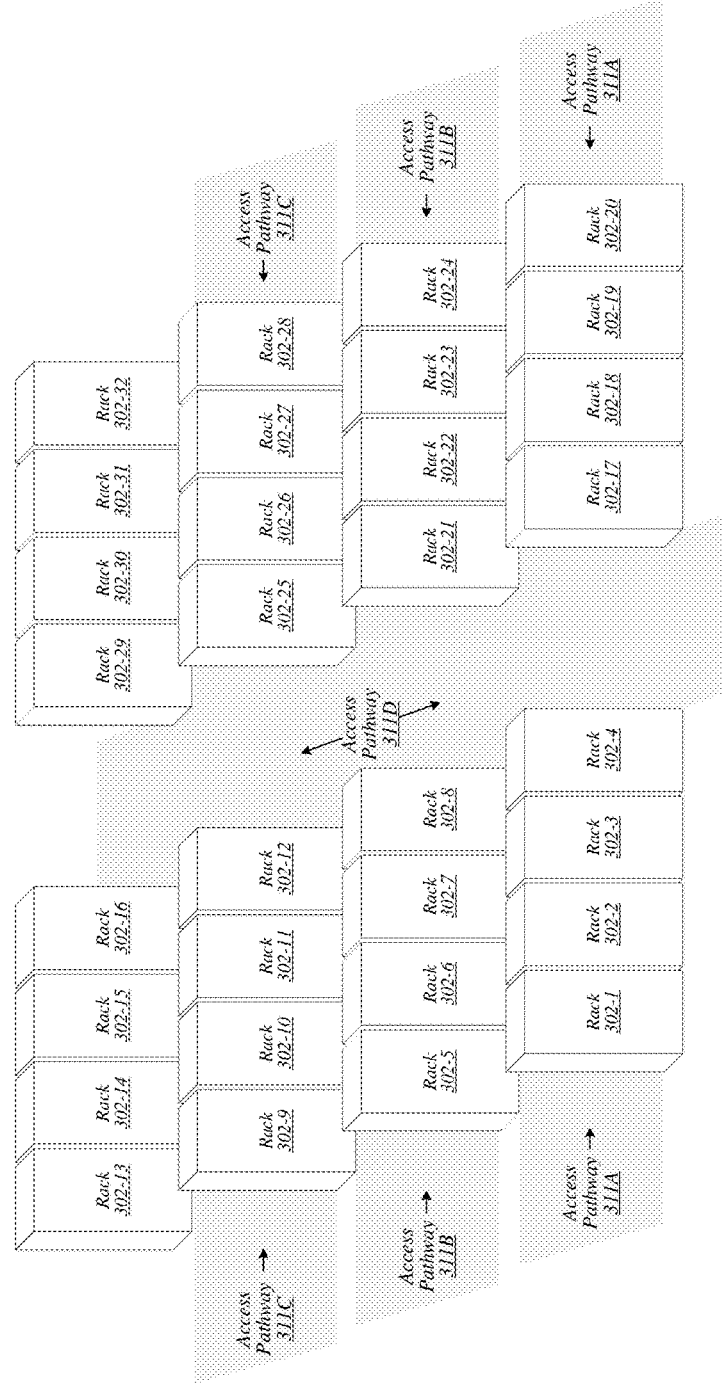
FIG. 3 illustrates a second example data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
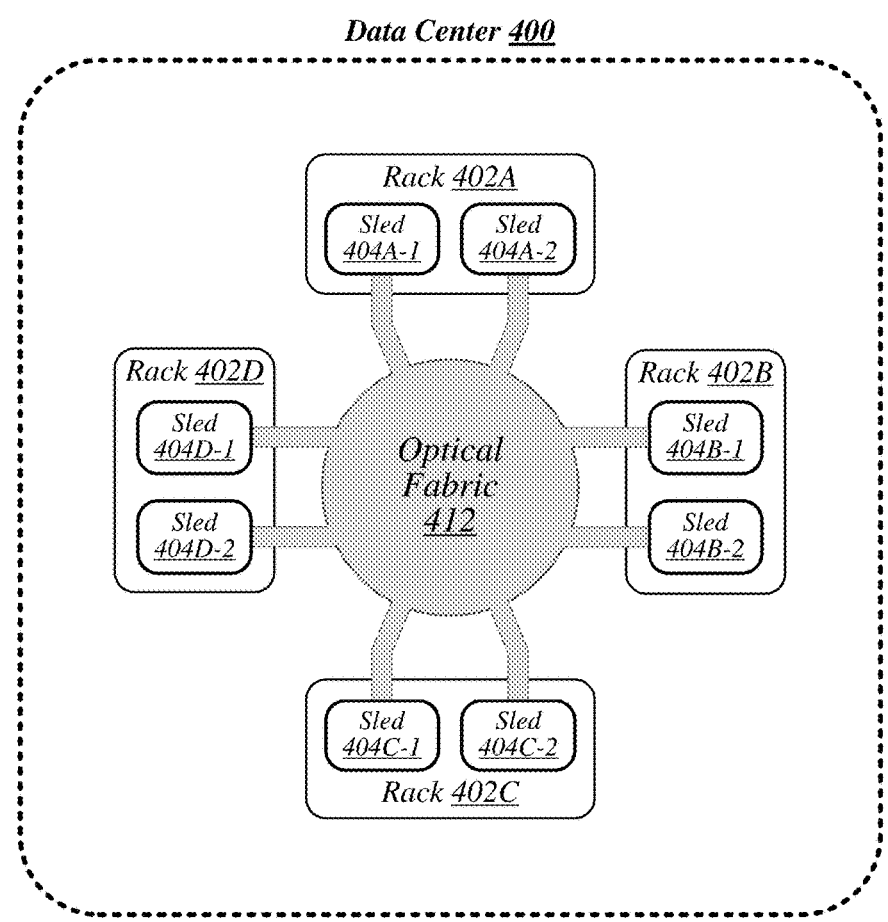
FIG. 4 illustrates a third example data center.

FIG. 4 illustrates an example of a data center 400 that may generally be representative of one in/for which one or more techniques described herein may be implemented according to various embodiments. As shown in this figure, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in this figure, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
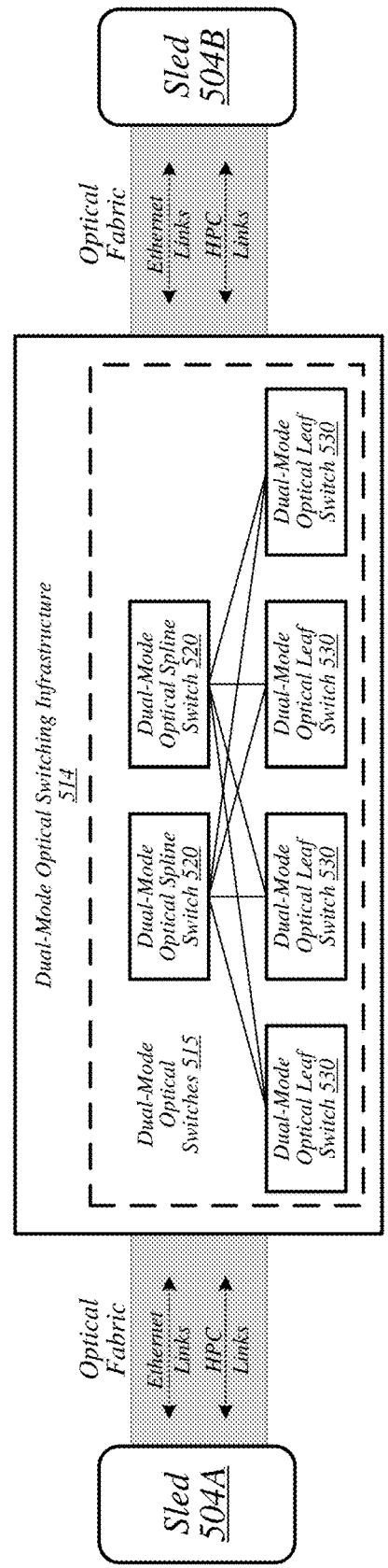
FIG. 5 illustrates a data center connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example. However, it is worthy to note, that the dual-mode optical switches can provide for separate fault domains within a single sled (e.g., a storage sled according to embodiments of the present disclosure, or the like). As such, information can be written across fault domains at the sled level, as opposed to the rack level to provide data loss, corruption, or failure mitigation at the sled level.

Figure 6:
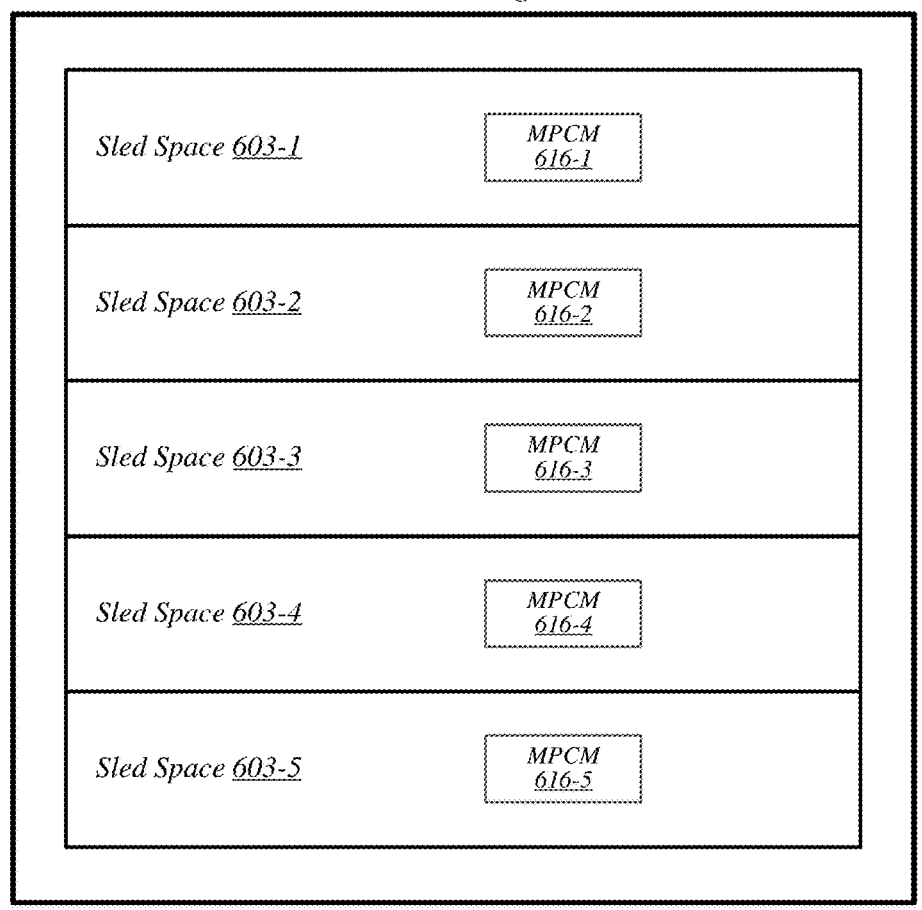
FIG. 6 illustrates a second example rack.

FIG. 6 illustrates a general overview of a rack architecture 600 that may be representative of an architecture of any particular one of the racks depicted in FIGS. 1 to 4 according to some embodiments. As reflected in this figure, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
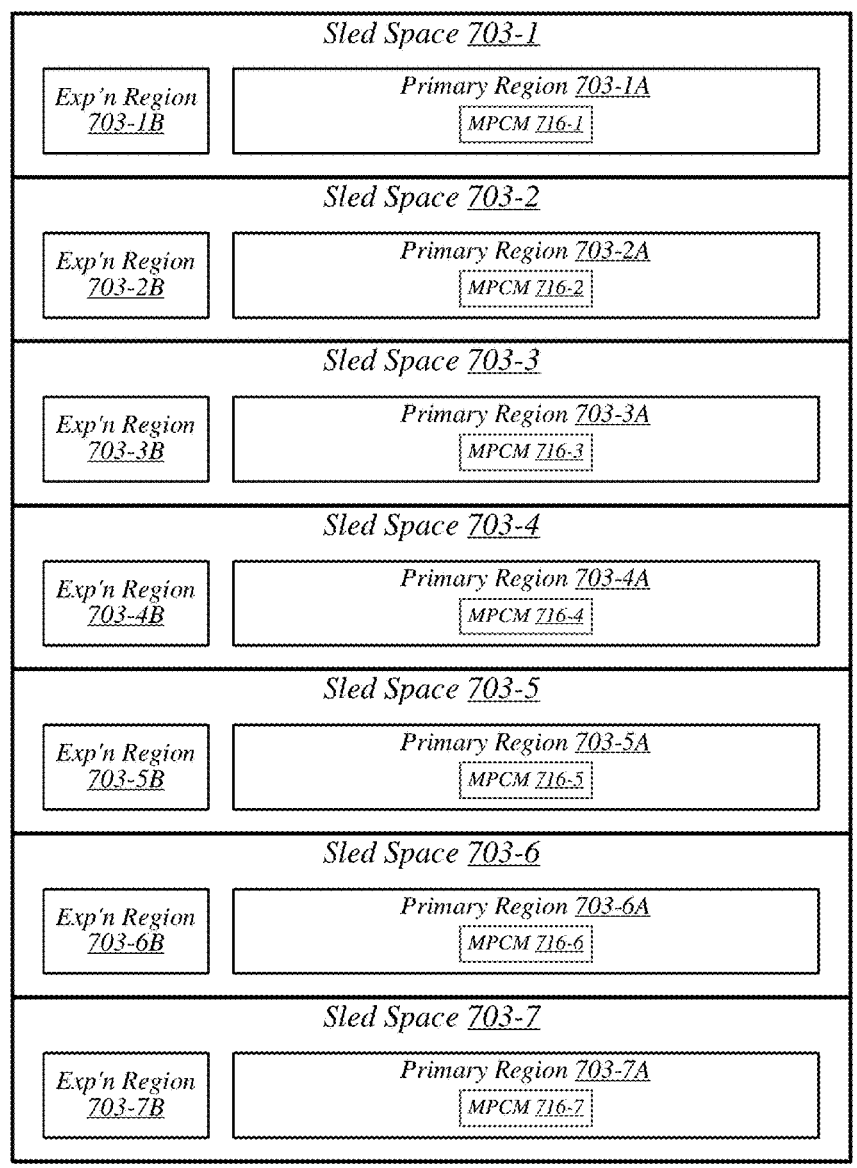
FIG. 7 illustrates a third example rack.
Figure 14:
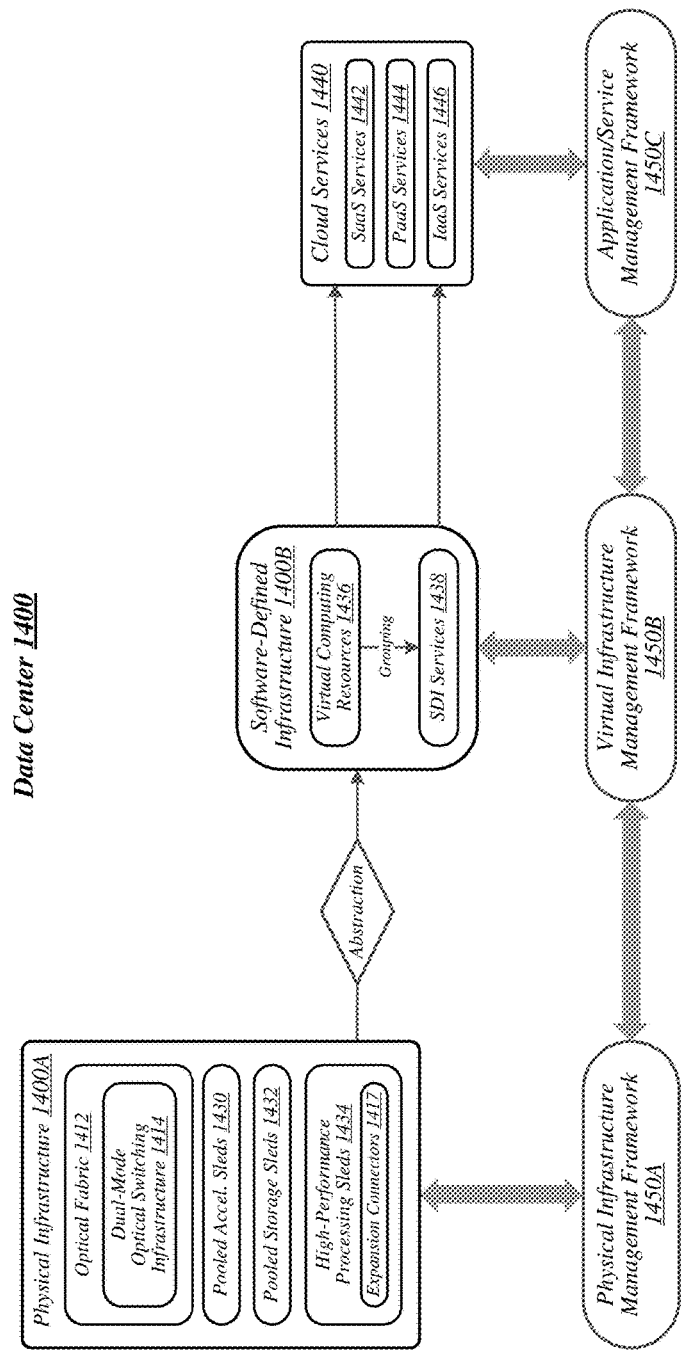
FIG. 14 illustrates a fourth example data center.
Figure 15:
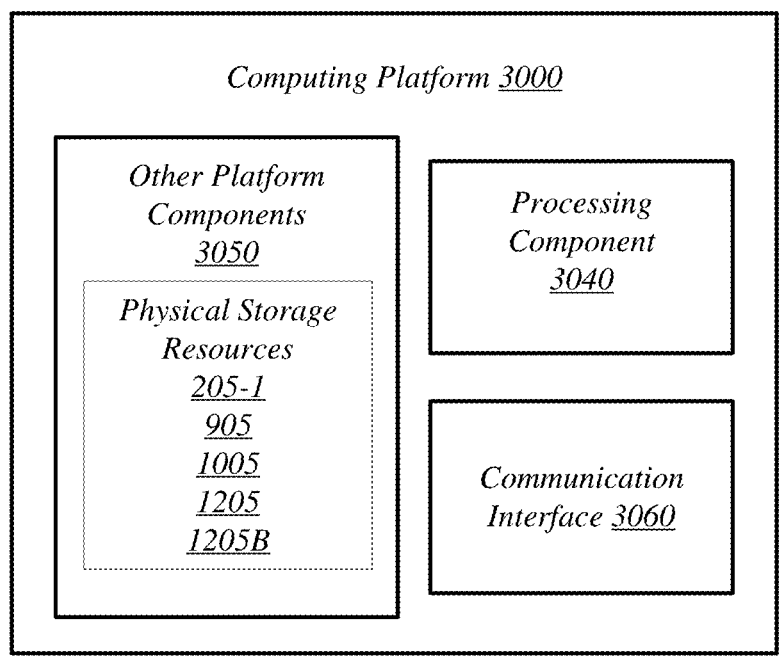
FIG. 15 illustrates an example computing platform.

FIG. 7 illustrates an example of a rack architecture 700 that may be representative of a rack architecture that may be implemented in order to provide support for sleds featuring expansion capabilities (e.g., such as sled 1404 and 1504 of FIGS. 14 and 15). In the particular non-limiting example depicted in this figure, rack architecture 700 includes seven sled spaces 703-1 to 703-7, which feature respective MPCMs 716-1 to 716-7. Sled spaces 703-1 to 703-7 include respective primary regions 703-1A to 703-7A and respective expansion regions 703-1B to 703-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module (e.g., such as, expansion sleds 1418 and 1518 of FIGS. 14 and 15), in the event that the inserted sled is configured with such a module.

Figure 8:
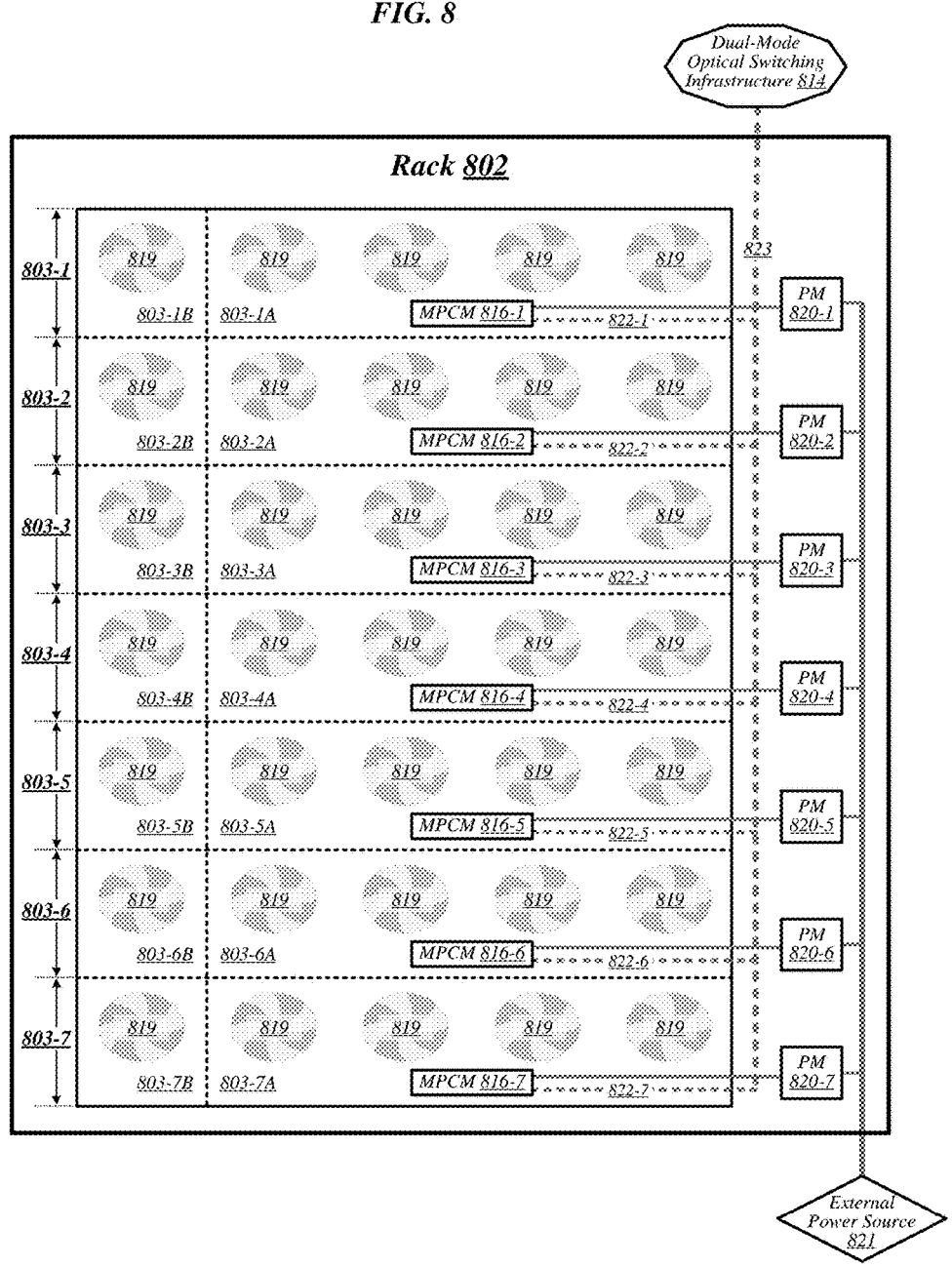
FIG. 8 illustrates a fourth example rack.

FIG. 8 illustrates an example of a rack 802 that may be representative of a rack implemented according to rack architecture 700 of FIG. 7 according to some embodiments. In the particular non-limiting example depicted in FIG. 8, rack 802 features seven sled spaces 803-1 to 803-7, which include respective primary regions 803-1A to 803-7A and respective expansion regions 803-1B to 803-7B. In various embodiments, temperature control in rack 802 may be implemented using an air cooling system. For example, as reflected in this figure, rack 802 may feature a plurality of fans 819 that are generally arranged to provide air cooling within the various sled spaces 803-1 to 803-7. In some embodiments, the height of the sled space is greater than the conventional "1U" server height. In such embodiments, fans 819 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250W) due to improved cooling (i.e., no thermal shadowing, more space between devices, more room for larger heat sinks, etc.).

MPCMs 816-1 to 816-7 may be configured to provide inserted sleds with access to power sourced by respective power modules 820-1 to 820-7, each of which may draw power from an external power source 821. In various embodiments, external power source 821 may deliver alternating current (AC) power to rack 802, and power modules 820-1 to 820-7 may be configured to convert such AC power to direct current (DC) power to be sourced to inserted sleds. In some embodiments, for example, power modules 820-1 to 820-7 may be configured to convert 277-volt AC power into 12-volt DC power for provision to inserted sleds via respective MPCMs 816-1 to 816-7. The embodiments are not limited to this example.

MPCMs 816-1 to 816-7 may also be arranged to provide inserted sleds with optical signaling connectivity to a dual-mode optical switching infrastructure 814, which may be the same as—or similar to—dual-mode optical switching infrastructure 514 of FIG. 5. In various embodiments, optical connectors contained in MPCMs 816-1 to 816-7 may be designed to couple with counterpart optical connectors contained in MPCMs of inserted sleds to provide such sleds with optical signaling connectivity to dual-mode optical switching infrastructure 814 via respective lengths of optical cabling 822-1 to 822-7. In some embodiments, each such length of optical cabling may extend from its corresponding MPCM to an optical interconnect loom 823 that is external to the sled spaces of rack 802. In various embodiments, optical interconnect loom 823 may be arranged to pass through a support post or other type of load-bearing element of rack 802. The embodiments are not limited in this context. Because inserted sleds connect to an optical switching infrastructure via MPCMs, the resources typically spent in manually configuring the rack cabling to accommodate a newly inserted sled can be saved.

Figure 9:
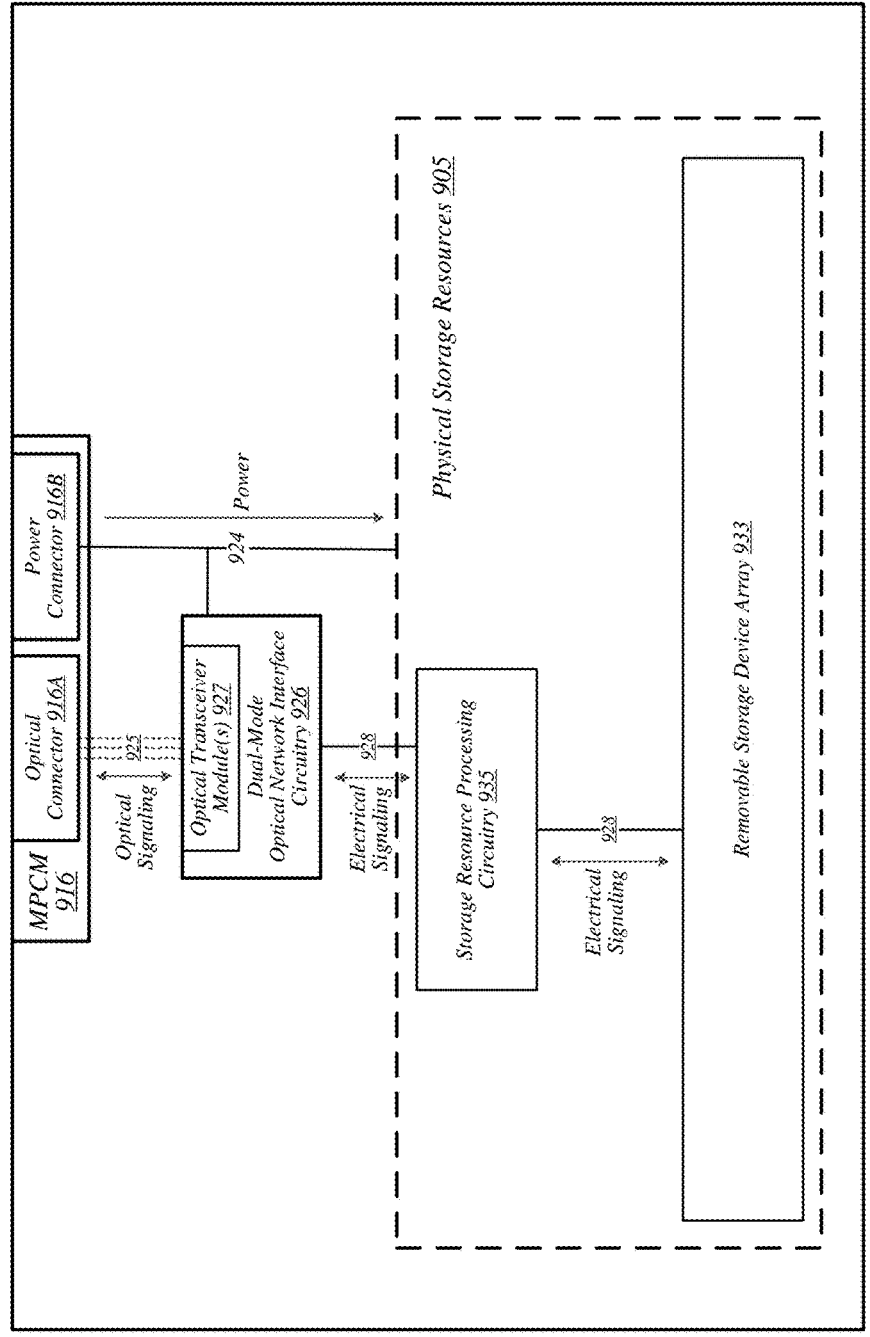
FIG. 9 illustrates a first example sled.

FIG. 9 illustrates an example of a sled 904 that may be representative of a sled designed for use in conjunction with a rack according to some embodiments (e.g., racks according to rack architectures 600 or 700 or rack 802). Sled 904 may feature an MPCM 916 that comprises an optical connector 916A and a power connector 916B, and that is designed to couple with a counterpart MPCM of a sled space in conjunction with insertion of MPCM 916 into that sled space. Coupling MPCM 916 with such a counterpart MPCM may cause power connector 916 to couple with a power connector comprised in the counterpart MPCM. This may generally enable physical resources 905 of sled 904 to source power from an external source, via power connector 916 and power transmission media 924 that conductively couples power connector 916 to physical resources 905. In particular, as describe herein, the present disclosure provides sleds for storage resources. As such, physical resources 905 are physical storage resources 905.

Physical storage resources 905 can include a removable storage device array 933 and storage resource processing circuitry 935. In some examples, the removable storage device array 933 can include a number of storage devices, such as, for example SSDs, non-volatile memory modules, or the like. It is noted, that as used herein, removable storage device array may include an array of storage devices, where each storage device in the array is removable independently from the others. In general, the removable storage device array 933 can have any capacity. In some examples, the removable storage devices array 933 can have been 0.5 and 2 peta-bytes storage capacity. More specifically, with some non-limiting examples, the removable storage device array 933 can accommodate between 2 and 24 removable devices. In a particular example, a sled can accommodate 4 removable drives. In another particular example, a sled can accommodate 16 removable drives. For illustration purposes only, it is assumed that the sled can accommodate 16 removable drives. In this example, where each one of the removable devices provides 32 tera-bytes of capacity, the sled 904 will provide 0.5 peta-bytes of capacity. Whereas, where each one of the removable devices provides 128 tera-bytes of capacity, the sled 904 will provide 2 peta-bytes of capacity.

Sled 904 may also include dual-mode optical network interface circuitry 926. Dual-mode optical network interface circuitry 926 may generally comprise circuitry that is capable of communicating over optical signaling media according to each of multiple link-layer protocols supported by dual-mode optical switching infrastructure 814 of FIG. 8. In some embodiments, dual-mode optical network interface circuitry 926 may be capable both of Ethernet protocol communications and of communications according to a second, high-performance protocol. In various embodiments, dual-mode optical network interface circuitry 926 may include one or more optical transceiver modules 927, each of which may be capable of transmitting and receiving optical signals over each of one or more optical channels. Thus, that the dual-mode optical network interface circuits 926 can provide for fault-domain granularity at the sled level (e.g., refer to FIG. 11). The embodiments are not limited in this context.

Coupling MPCM 916 with a counterpart MPCM of a sled space in a given rack may cause optical connector 916A to couple with an optical connector comprised in the counterpart MPCM. This may generally establish optical connectivity between optical cabling of the sled and dual-mode optical network interface circuitry 926, via each of a set of optical channels 925. With some examples, optical channels 925 comprise 4 optical fiber channels. With some examples, each of the optical channels can provide between 20 and 80 Gigabytes per second (GB/s) bandwidth. With a specific example, each of the optical channels can provide 50 GB/s bandwidth. As another example each of the optical channels can provide 200 GB/s bandwidth. Dual-mode optical network interface circuitry 926 may communicate with the physical resources 905 of sled 904 via electrical signaling media 928. In addition to the dimensions of the sleds and arrangement of components on the sleds to provide improved cooling and enable operation at a relatively higher thermal envelope (e.g., 250W), as described above with reference to FIG. 8, in some embodiments, a sled may include one or more additional features to facilitate air cooling, such as a heatpipe and/or heat sinks arranged to dissipate heat generated by physical resources 905. It is worthy of note that although the example sled 904 depicted in FIG. 9 does not feature an expansion connector, any given sled that features the design elements of sled 904 may also feature an expansion connector according to some embodiments. The embodiments are not limited in this context.

The storage resource processing circuitry 935 can include a memory controller configured to coordinate access (e.g., writing, reading, or the like) to the devices of the removable storage drive array 933. In some examples, the storage resource processing circuitry 935 can provide caching, striping, pooling, compression, data duplication, thin provisioning, data cloning, or other data management techniques for the physical storage resources 905. In some examples, the individual devices of the removable storage device array 933 can be coupled to the storage resources processing circuitry 935 via any of a variety of interconnects, such as, for example, peripheral component interconnect express (PCIe). In particular, the electrical signaling media 928 coupling removable storage device array 933 and storage resource processing circuitry 935 can be a 4 lane PCIe4 bus, to provide non-volatile memory express (NVMe) compliant logical device interconnect capabilities. For example, where the removable storage device array 933 accommodates 16 storage devices, the electrical signaling media 928 coupling removable storage device array 933 can provide 16 PCI Gen4×4 connections. As another example, where the removable storage device array 933 can accommodate 4 storage devices, the electrical signaling media 928 coupling removable storage device array 933 can provide 4 PCI4×4 connections.

Furthermore, it is noted, that the techniques and connectivity schemes detailed herein can be applied to all physical storage resources 505, including both removable storage drive array 533 and memory array 537.

With some examples, the electrical signaling media 928 coupling storage resource processing circuitry 935 and dual-mode optical network interface circuitry 926 can comprise PCIe4 or other interface system, such as, for example a proprietary interface.

Figure 10:
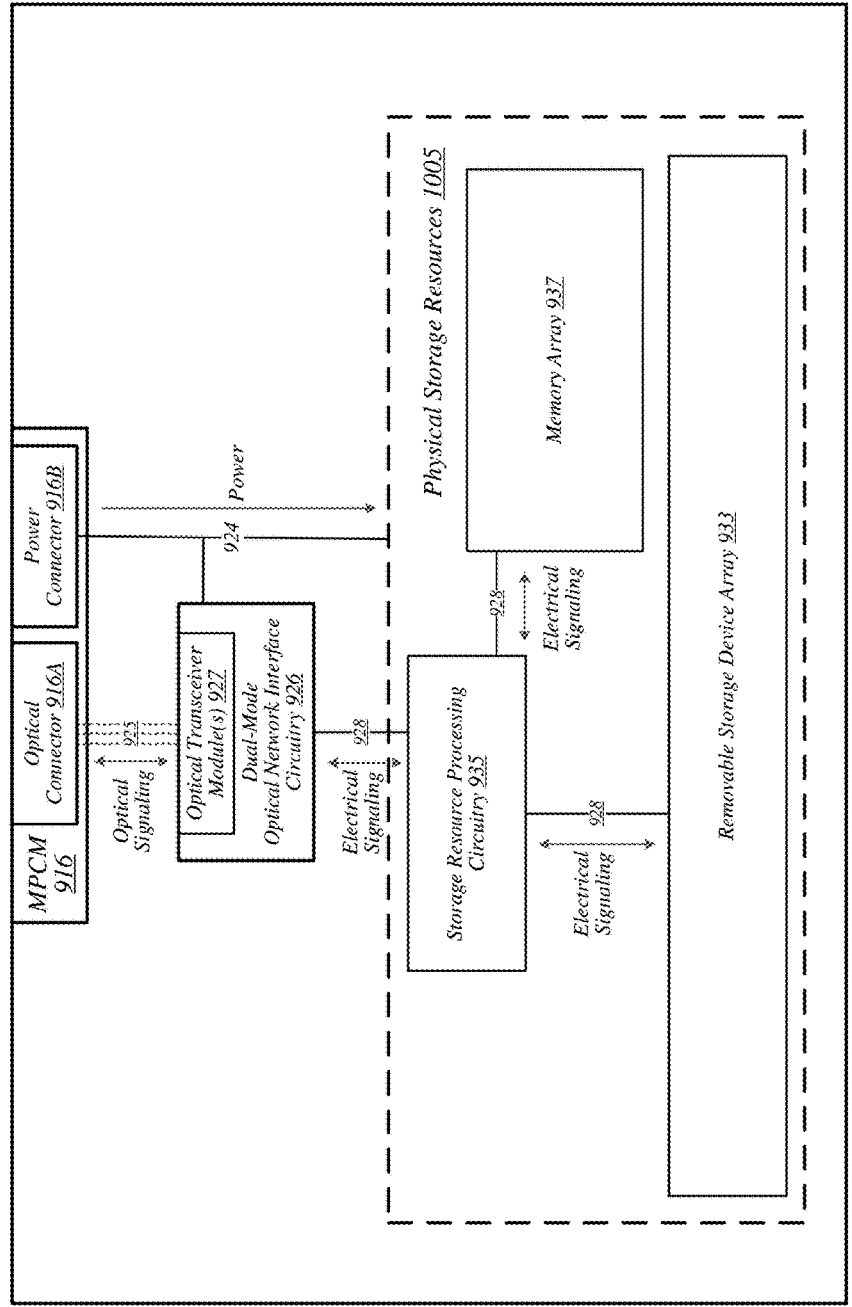
FIG. 10 illustrates a second example sled.

With some examples, physical storage resources 905 can include a memory array coupled to the removable storage device array 933. FIG. 10 illustrates an example of a sled 1004 that may be representative of a sled designed for use in conjunction with a rack according to some embodiments (e.g., racks according to rack architectures 600 or 700 or rack 802). Sled 1004 may feature similar components to sled 904 described with respect to FIG. 9. Additionally, physical storage resources 1005 of sled 1004 can include a memory array 937. In some examples, memory array 937 can include volatile and/or non-volatile memory. For example, memory array can include a number of dual-inline memory modules (DIMMs) coupled to storage resource processing circuitry via electrical signaling media 928. In some examples, memory array 937 can include RAM, DRAM, DDRAM, synchronous DRAM, NAND memory, NOR memory, 3-Dimensional cross-point memory (e.g., 3D XPoint memory by Intel®, or the like), ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

Figure 11:
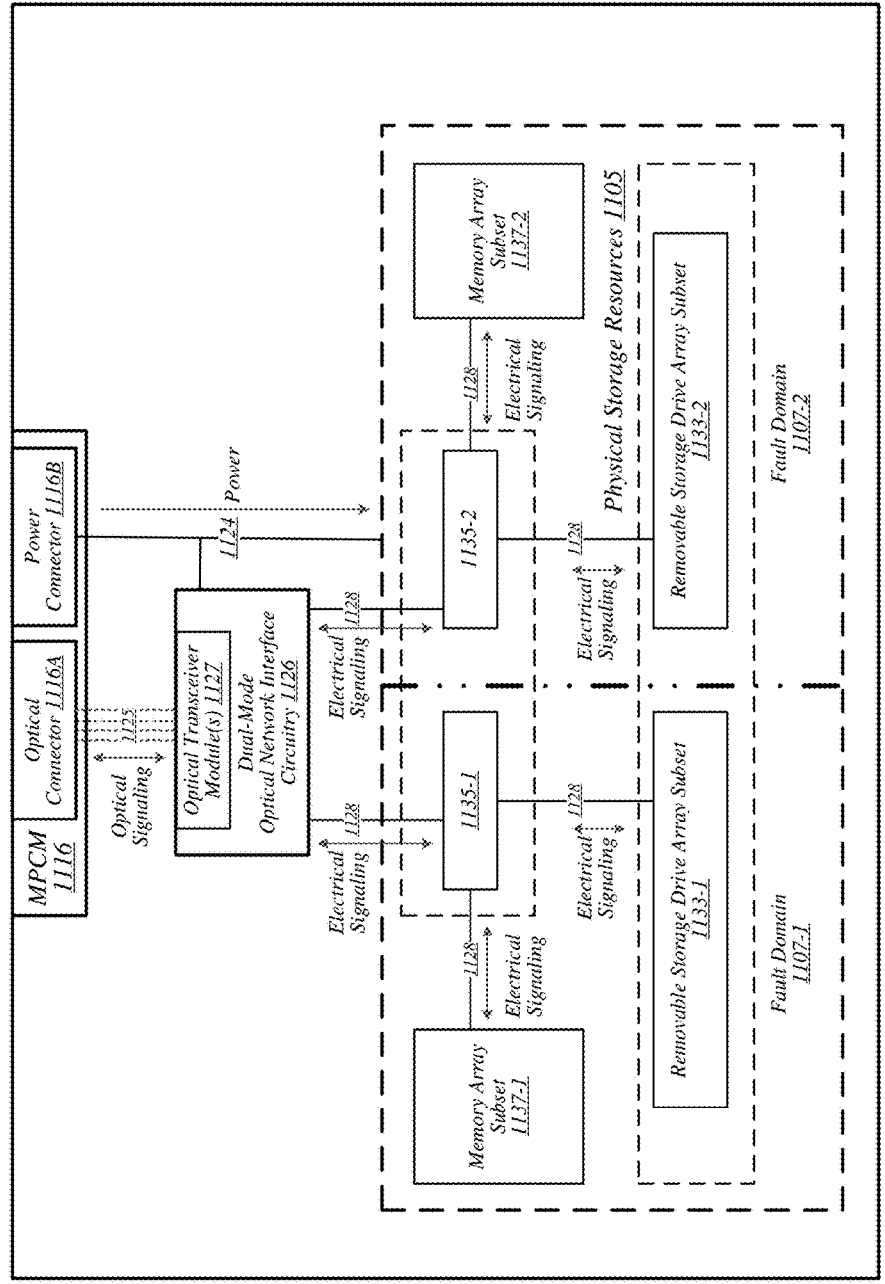
FIG. 11 illustrates a third example sled.

With some examples, removable storage drive array 933 and memory array 937 can be split into subsets or groups of removable storage drive arrays and memory arrays. In such an example, multiple storage resource processing circuitry 935 could be provided. FIG. 11 depicts such an example sled. Turning more specifically to FIG. 11, sled 1104 is depicted. In general, sled 1104 can comprise similar components as sled 1004 of FIG. 10. However, the removable storage drive array and memory array is split into two subsets. In particular, sled 1104 comprises physical storage resources 1105, which include removable storage drive array subsets 1133-1 to 1133-2, storage resource processing circuitry 1135-1 to 1135-2, and memory array subsets 1137-1 to 1137-2. As depicted, storage resource processing circuitry 1135-1 is operably couple to removable storage drive array subset 1133-1 and memory array subset 1137-1 while storage resource processing circuitry 1135-2 is operably couple to removable storage drive array subset 1133-2 and memory array subset 1137-2.

Storage resource processing circuitry 1135-1 and 1135-2 are operably coupled to removable storage drive array subsets and memory array subsets via electrical signaling media 1128. Electrical signaling media 1138 can be any signaling media, such as, for example, a PCIe4 bus to provide NVMe compliant logical device interconnect capabilities.

Storage resource processing circuitry 1135-1 and 1135-2 are further operably coupled to dual-mode optical network interface circuitry 1126 via electrical signaling medial 1128. It is noted, that electrical signaling media 1128 coupling dual-mode optical network interface circuitry to storage resource processing circuitry 1135-1 and 1135-2 can be a different type, configuration, and or support a different signaling standard than electrical signaling media 1128 coupling storage resource processing circuitry 1135-1 and 1135-2 to removable storage drive array subsets and memory array subsets. Examples are not limited in this context.

Furthermore, sled 1104 can feature dual-mode optical network interface circuitry 1126 including optical transceiver module(s) 1127 coupled to optical connector 1116A of MPCM 1116 via optical channels 1125. Sled 1104 can additionally, feature power connector 1116B of MPCM 1116 to provide power to components of sled 1104 via power transmission media 1124.

In some embodiments, physical resources 1105 can be split into multiple fault domains. In this illustrative example, sled 1104 includes 2 fault domains 1107-1 and 1107-2. In particular: fault domain 1107-1 includes storage resource processing circuitry 1135-1, removable storage drive array subset 1133-1, and memory array subset 1137-1; while fault domain 1107-2 includes storage resource processing circuitry 1135-2, removable storage drive array subset 1133-2 and memory array subset 1137-2. Accordingly, during operation, fault domains can "fail over" to each other at the sled level to provide mitigation of data loss.

Figure 12A:
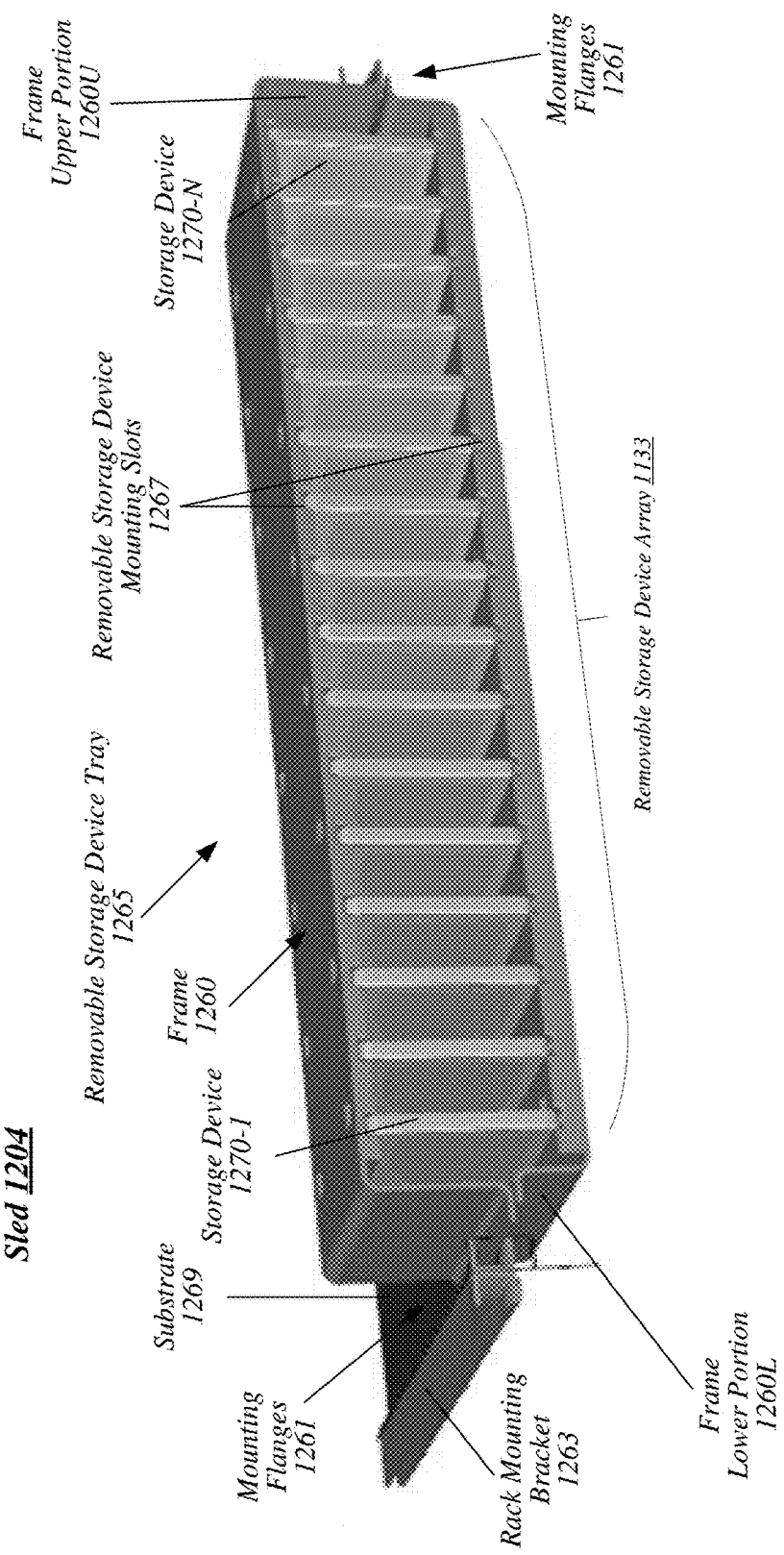
FIGS. 12A-12C illustrate perspective views of a fourth example sled.
Figure 12B:
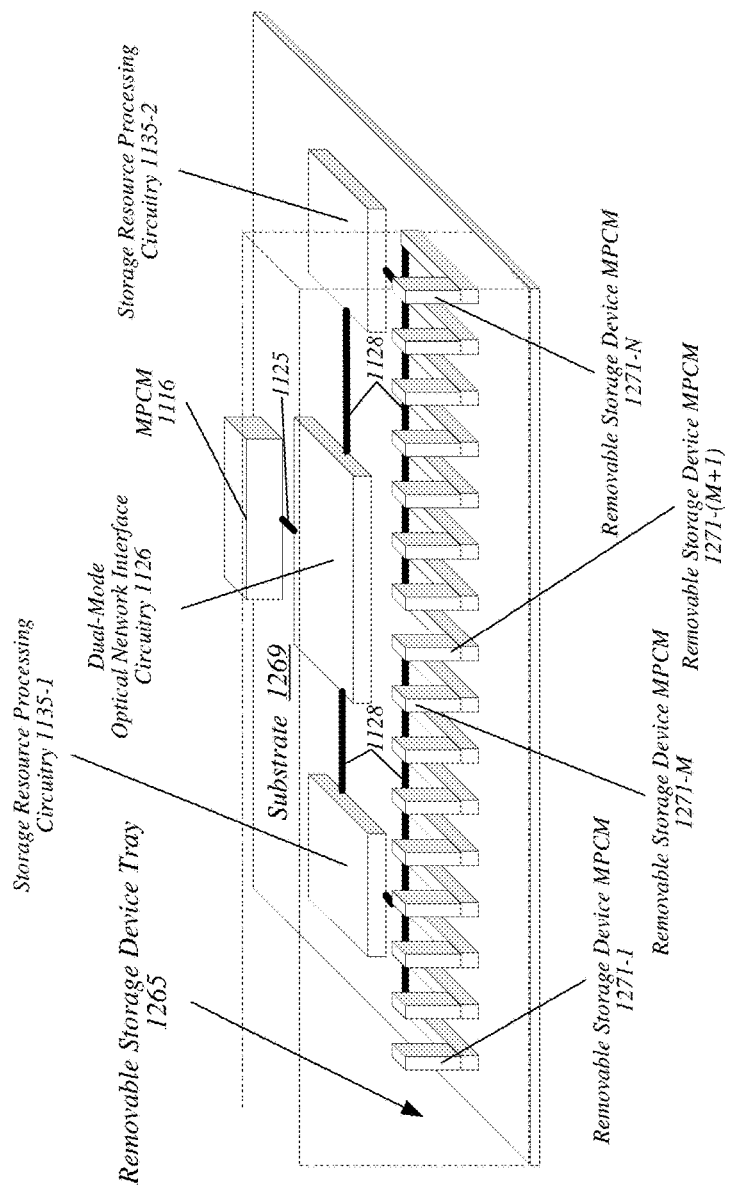
Figure 12C:
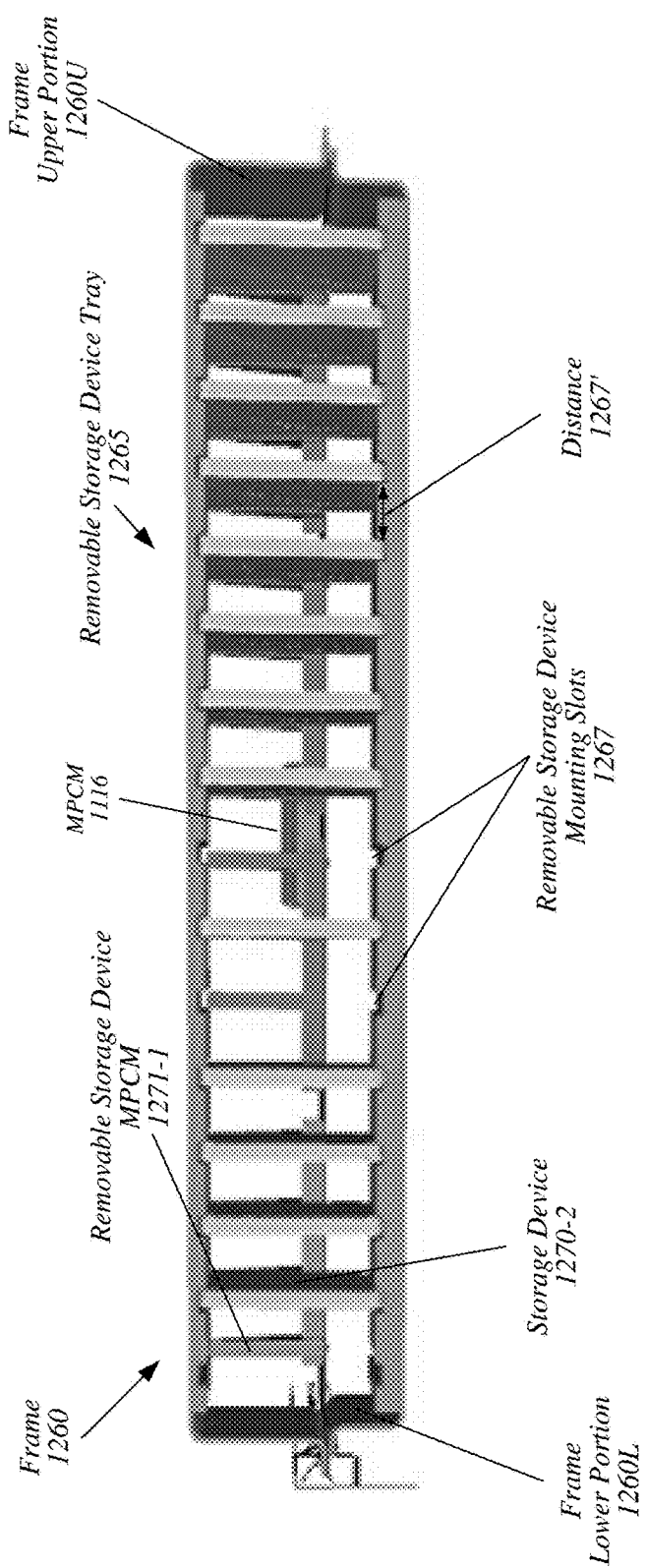

FIGS. 12A, 12B and 12C illustrate perspective views of a sled 1204 that may be representative of a sled designed for use in conjunction with a rack according to some embodiments (e.g., racks according to rack architectures 600 or 700 or rack 802). In particular, these figures depict a sled comprising physical storage resources. The sled is configured to be automatically and/or robotically mounted to a rack of a data center. As a non-limiting example, the depicted sled can be implemented as sled 204-1 of rack 202 in data center 200 of FIG. 2, which as depicted, includes physical storage resources 205-1. It is noted, that the sled 1204 is described with reference to the sled 1104 depicted in FIG. 11. However, this is done for purposes of convenience and clarity only, and not to be limiting.

Turning more specifically to FIG. 12A, the sled 1204 can include a frame 1260 having mounting flanges 1261 at opposing ends. For example, mounting flanges 1261 are depicted at lateral ends of frame 1260. In some examples, frame 1260 can include two parts or portions, which can be mated together (e.g., as depicted) to form frame 1260. For example, this figure illustrates a frame upper portion 1260U and a frame lower portion 1260L.

The mounting flanges 1261 can be arranged to mate into mounting brackets 1263 of a rack. In particular, mounting flanges 1261 are arranged to facilitate automatic installation and/or removal from a rack. More specifically, mounting flanges 1261 can be sized, dimensioned, and/or shaped to automatically insert into and remove from rack mounting brackets 1263. Mounting flanges 1261 and rack mounting bracket 1263 can be sized, dimensioned, and/or shaped to align sled 1204 within a sled space (e.g., sled space 604 depicted in FIG. 6, or the like) and to position sled 1204 to "blind" mate with a corresponding MPCM within a sled space.

The frame 1260 comprises a removable storage device tray 1265 comprising a number of removable storage device mounting slots 1267. In general, the removable storage device tray 1265 includes at least one removable storage device mounting slots 1267 for each removable storage device to be inserted into removable storage device tray 1265. For example, the removable storage device tray 1265 of this figure is depicted including storage devices 1270. For example, storage devices 1270-1 to 1270-N are depicted. Each of the removable storage devices 1270-1 to 1270-N are depicted inserted into corresponding removable storage device mounting slots 1267. In some examples, removable storage device mounting slots 1267 can be formed into removable storage device mounting tray 1265 to retain storage devices 1270-1 to 1270-N in a vertical arrangement disposed laterally across removable storage device tray 1265. The removable storage device mounting slots 1267 can be spaced apart a distance to facilitate automatic (e.g., robotic, or the like) installation and/or removal of individual storage devices 1270. For example, removable storage device mounting slots 1267 can be spaced apart a distance to facilitate a robotic grabbing apparatus to grip a single one of the storage devices 1270.

It is noted, the removable storage device tray 1265 can include any number of removable storage device mounting slots 1267 to accommodate any number of storage devices 1270. However, in some examples, the removable storage device tray 1265 can include 16 pairs of removable storage device mounting slots 1267 to accommodate 16 storage devices 1270. In another example, the removable storage device tray 1265 can include 4 pairs of removable storage device mounting slots 1267 to accommodate 4 storage devices 1270. The storage devices 1270-1 to 1270-N depicted can form a removable storage device array 1133. It is noted, removable storage drive array 1133 can include any of a variety of non-volatile memory storage devices, such as, for example, SSDs, non-volatile DIMMS, or the like. Examples are not limited in this context.

Sled 1204 includes a substrate 1269 coupled to frame 1261. Upon, substrate 1269, can be mounted a number of components of sled 1204. Turning more particularly to FIG. 12B, sled 1204, without frame 1261, is depicted to more fully illustrate substrate 1269 and placement and/or disposition of components on substrate 1269. Furthermore, removable storage device tray 1265 is depicted in block form with dashed borders.

Sled 1204 can include MPCM 1116. In particular, sled 1204 can include MPCM 1116 disposed on substrate 1269 at a rear of sled 1204, in a position to mount with a corresponding MPCM of a sled space into which sled 1204 is inserted (e.g., MPCM 616-1 of FIG. 6, or the like). Sled 1204 can include dual-mode optical network interface circuitry 1126 coupled to MPCM 1116 via optical channels 1125. Sled 1204 can further include a number of storage resource processing circuitry 1135. For example, this figure illustrates sled 1204 including storage resource processing circuitry 1135-1 and storage resource processing circuitry 1135-2 coupled to dual-mode optical network interface circuitry 1126.

Sled 1204 further includes a number of removable storage device MPCMs 1271. For example, a removable storage device MPCM 1271 coupled to a one of the storage resource processing circuitry 1135 can be provided for each storage device to which removable storage device tray 1265 is arranged to accommodate. For example, sled 1204 is depicted including removable storage device MPCM 1271-1 to 1271-M coupled to storage resource processing circuitry 1135-1 and removable storage device MPCM 1271-(M+1) to 1271-N coupled to storage resource processing circuitry 1135-2. Removable storage device MPCMs 1271-1 to 1271-N can be positioned to facilitate automated mating and mechanical coupling of connection interfaces of storage devices 1270-1 to 1270-N to electrical signaling media 928 as storage device 1270-1 to 1270-N are seated in removable storage device tray 1265, and particularly, in removable storage device mounting slots 1267. For example, turning more specifically to FIG. 12C, sled 1204 is depicted with a number of storage devices 1270 removed from removable storage device tray 1265. As can be seen, a pair of removable storage device mounting slots 1267 are aligned with a corresponding removable storage device MPCM 1271 to facilitate automated mechanical coupling of a storage device 1271 as it is inserted (e.g., via robotic insertion, or the like) into removable storage device mounting slots 1267. In some examples, one of each pair of removable storage device mounting slots 1267 are formed in and/or disposed on frame lower portion 1260L while the other one of each pair of removable storage device mounting slots 1267 are formed in and/or disposed on frame upper portion 1260U to retain each of the plurality of storage devices vertically.

In some examples, each pair of the removable storage device mounting slots 1267 are spaced apart from another pair of the removable storage device mounting slots 1267 a distance (e.g., distance 1267'). In illustrative examples, distance 1267' can be large enough to accommodate a robotic apparatus (e.g. hand, gripper, claw, pincher, or the like) being inserted around individual ones of the storage devices 1270. It is noted, that exact dimensions can vary based on the implementation, however, the distance 1267' can be sufficiently large to facilitate robotic insertion and removal of the plurality of storage devices, even on an individual scale.

Figure 13A:
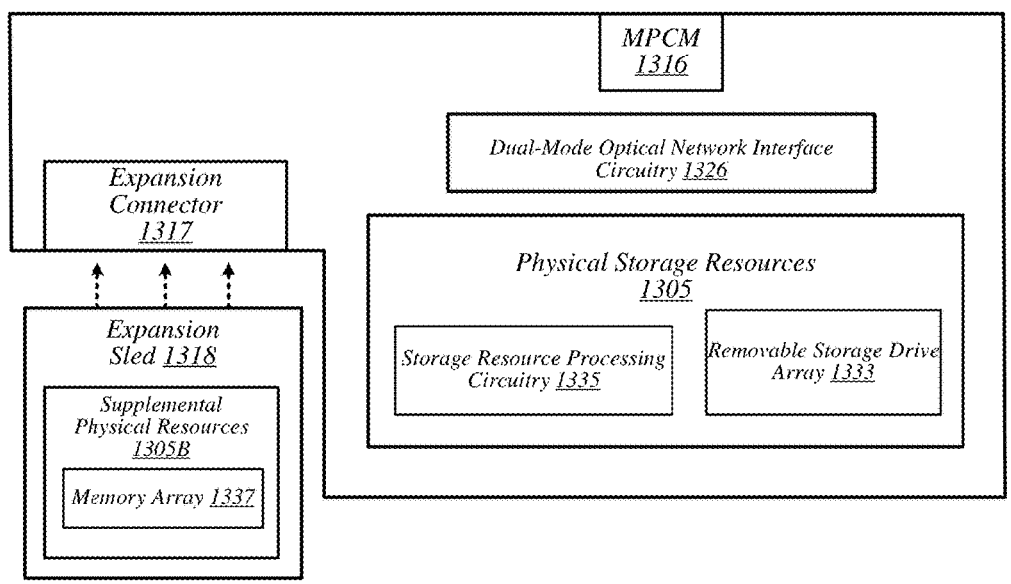
FIGS. 13A-13B illustrates a fifth example sled and corresponding perspective view.

As noted above, with some examples, a sled including physical storage resources (e.g., sled 1004 of FIG. 10, sled 1104 of FIG. 11, or the like) can include a memory array. With some examples, memory array 1137 can be disposed on substrate 1269 of sled 1204. For example, substrate 1269 can include a number of sockets (e.g., DIMM sockets, or the like) to accept memory modules (e.g., DIMMs, or the like) coupled to storage resource processing circuitry 1135. In some examples, memory array 1137 can be coupled to sled via an expansion sled. FIG. 13A illustrates an example of a sled 1304 that may be representative of a sled of such a type. As shown in this figure, sled 1304 may comprise a set of physical resources 1305, as well as an MPCM 1316 designed to couple with a counterpart MPCM when sled 1304 is inserted into a sled space, such as any of sled spaces 803-1 to 803-7 of FIG. 8. Sled 1304 can also feature dual-mode optical network interface circuitry 1326 to couple components of sled 1304 to optical fabric of a data center.

Sled 1304 may also feature an expansion connector 1317. Expansion connector 1317 may generally comprise a socket, slot, or other type of connection element that is capable of accepting one or more types of expansion modules, such as an expansion sled 1318. By coupling with a counterpart connector on expansion sled 1318, expansion connector 1317 may provide physical resources 1305 with access to supplemental physical resources 1305B residing on expansion sled 1318.

For example, physical resources 1305 can comprise physical storage resources, such as, removable storage drive array 1333 and storage resource processing circuitry 1335. A memory array 1337 can be provided for sled 1304 via supplemental physical resources 1305B on expansion sled 1318.

Figure 13B:
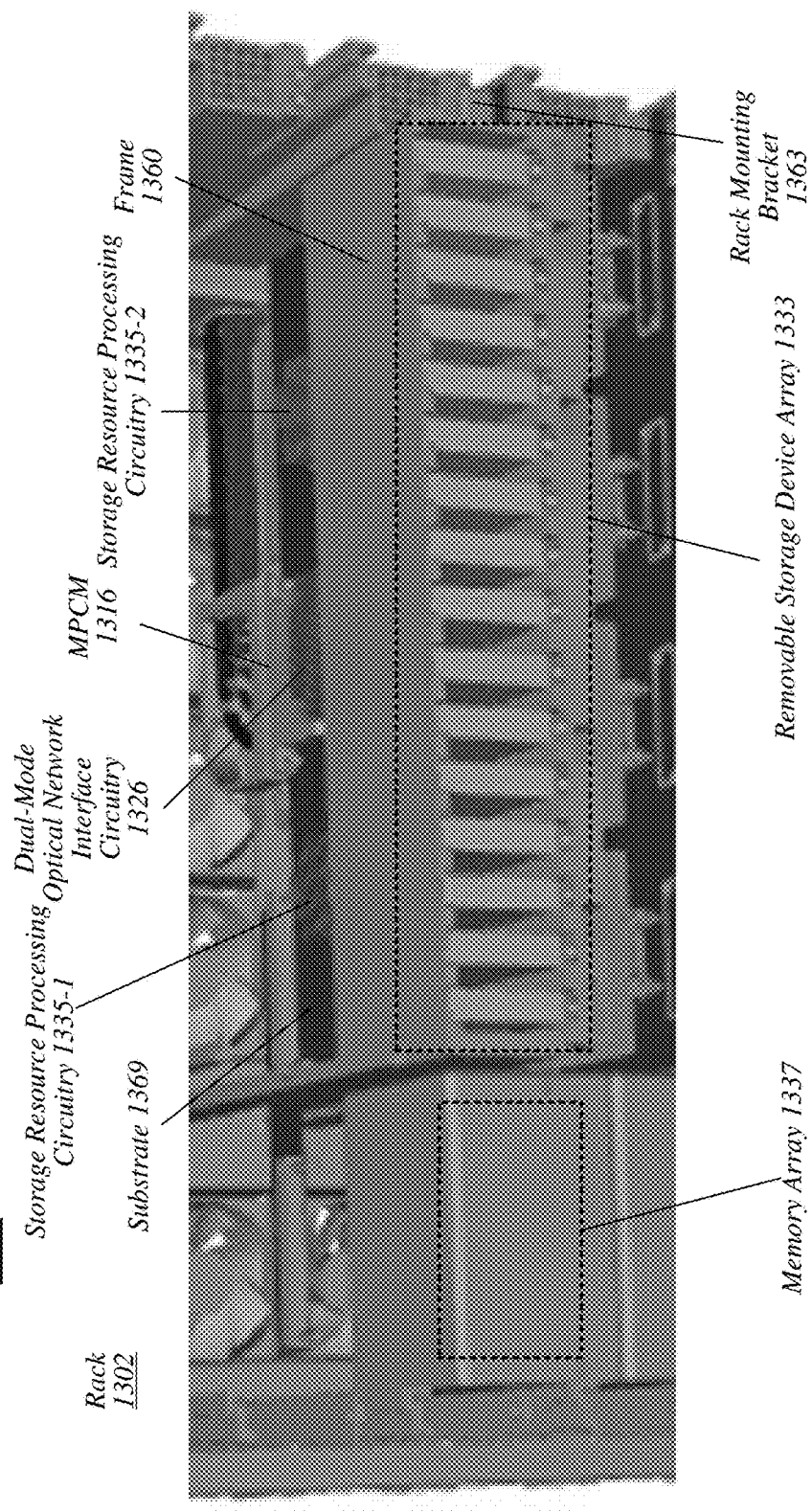

Turning more particularly to FIG. 13B, a perspective view of the example sled 1304 of FIG. 13A is depicted. In this illustrative example, frame 1360 having mounting flanges (not shown) is disposed in a rack 1302. Specifically, frame 1360 is disposed in rack mounting brackets 1363. Sled 1304 includes substrate 1369 coupled to frame 1360. Upon substrate 1369 are mounted MPCM 1316, dual-mode optical interface circuitry 1326, storage resource processing circuitry 1335-1 and 1335-2 as well as removable storage device MPCMs (not shown).

FIG. 14 illustrates an example of a data center 1400 that may generally be representative of one in/for which one or more techniques described herein may be implemented according to various embodiments. As reflected in this figure, a physical infrastructure management framework 1450A may be implemented to facilitate management of a physical infrastructure 1400A of data center 1400. In various embodiments, one function of physical infrastructure management framework 1450A may be to manage automated maintenance functions within data center 1400, such as the use of robotic maintenance equipment to service computing equipment within physical infrastructure 1400A. In some embodiments, physical infrastructure 1400A may feature an advanced telemetry system that performs telemetry reporting that is sufficiently robust to support remote automated management of physical infrastructure 1400A. In various embodiments, telemetry information provided by such an advanced telemetry system may support features such as failure prediction/prevention capabilities and capacity planning capabilities. In some embodiments, physical infrastructure management framework 1450A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in this figure, the physical infrastructure 1400A of data center 1400 may comprise an optical fabric 1412, which may include a dual-mode optical switching infrastructure 1414. Optical fabric 1412 and dual-mode optical switching infrastructure 1414 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1400. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1430 may be included among the physical infrastructure 1400A of data center 1400, each of which may comprise a pool of accelerator resources—such as co-processors and/or FPGAs, for example—that is available globally accessible to other sleds via optical fabric 1412 and dual-mode optical switching infrastructure 1414.

In another example, in various embodiments, one or more pooled storage sleds 1432 may be included among the physical infrastructure 1400A of data center 1400, each of which may comprise a pool of storage resources that is available globally accessible to other sleds via optical fabric 1412 and dual-mode optical switching infrastructure 1414. In some embodiments, such pooled storage sleds 1432 may comprise pools of solid-state storage devices such as solid-state drives (SSDs). In various embodiments, one or more high-performance processing sleds 1434 may be included among the physical infrastructure 1400A of data center 1400. In some embodiments, high-performance processing sleds 1434 may comprise pools of high-performance processors, as well as cooling features that enhance air cooling to yield a higher thermal envelope of up to 250W or more. In various embodiments, any given high-performance processing sled 1434 may feature an expansion connector 1417 that can accept a far memory expansion sled, such that the far memory that is locally available to that high-performance processing sled 1434 is disaggregated from the processors and near memory comprised on that sled. In some embodiments, such a high-performance processing sled 1434 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1400A in order to define a virtual infrastructure, such as a software-defined infrastructure 1400B. In some embodiments, virtual computing resources 1436 of software-defined infrastructure 1400B may be allocated to support the provision of cloud services 1440. In various embodiments, particular sets of virtual computing resources 1436 may be grouped for provision to cloud services 1440 in the form of SDI services 1438. Examples of cloud services 1440 may include—without limitation—software as a service (SaaS) services 1442, platform as a service (PaaS) services 1444, and infrastructure as a service (IaaS) services 1446.

In some embodiments, management of software-defined infrastructure 1400B may be conducted using a virtual infrastructure management framework 1450B. In various embodiments, virtual infrastructure management framework 1450B may be designed to implement workload fingerprinting techniques and/or machine-learning techniques in conjunction with managing allocation of virtual computing resources 1436 and/or SDI services 1438 to cloud services 1440. In some embodiments, virtual infrastructure management framework 1450B may use/consult telemetry data in conjunction with performing such resource allocation. In various embodiments, an application/service management framework 1450C may be implemented in order to provide QoS management capabilities for cloud services 1440. The embodiments are not limited in this context.

FIG. 15 illustrates an example computing platform 3000. In some examples, as shown in this figure, computing platform 3000 may include any of a processing component 3040, other platform components 3050 or a communications interface 3060. According to some examples, computing platform 3000 may host physical storage resources for a data center, such as, the data centers depicted herein. Computing platform 3000 may either be a single physical server or a composed logical server that includes combinations of physical resources from a pool of configurable physical resources.

According to some examples, processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, other platform components 3050 can include physical storage resources 205-1, 905, 1005, 1205 and/or 1205B.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

The components and features of computing platform 3000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function.

The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present disclosure can be implemented in any of a variety of embodiments, such as, for example, the following non-exhaustive listing of example embodiments.

EXAMPLE 1

An apparatus for a sled of a data center, comprising: a frame to couple to a rack of a data center, the frame comprising a plurality of removable storage device mounting slots arranged to receive a plurality of storage devices; a substrate coupled to the frame; a multi-purpose connector module (MPCM) disposed on the substrate, the MPCM arranged to couple to a corresponding connector module of the rack; and a plurality of storage device MPCMs disposed on the substrate, each of the plurality of storage device MPCMs coupled to the MPCM arranged to couple to a corresponding one of the plurality of storage devices.

EXAMPLE 2

The apparatus of example 1, comprising a dual-mode optical network interface disposed on the substrate, the dual-mode optical network interface operably coupled to the MPCM and the storage device MPCMs.

EXAMPLE 3

The apparatus of example 2, comprising at least one storage resource processing circuit, the dual-mode optical network interface operably coupled to the storage device MPCMs via the at least one storage resource processing circuit.

EXAMPLE 4

The apparatus of example 3, the at least one storage resource processing circuit comprising a first storage resource processing circuit and a second storage resource processing circuit, the dual-mode optical network interface operably coupled to a first subset of the storage device MPCMs via the first storage resource processing circuit and operably coupled to a second subset of the storage device MPCMs via the second storage resource processing circuit.

EXAMPLE 5

The apparatus of example 4, comprising the plurality of storage devices.

EXAMPLE 6

The apparatus of any one of examples 1 to 5, comprising a plurality of memory module sockets to receive a plurality of memory modules, each of the plurality of memory module sockets coupled to the MPCM.

EXAMPLE 7

The apparatus of example 6, comprising the plurality of memory modules.

EXAMPLE 8

The apparatus of any one of examples 1 to 5, the frame comprising at least two mounting flanges disposed on lateral ends of the frame, the at least two mounting flanges arranged to mechanically couple to mounting brackets of the rack.

EXAMPLE 9

The apparatus of example 8, the rack mounting flanges and the mounting brackets arranged such that the frame is capable of being robotically inserted and removed from the rack.

EXAMPLE 10

The apparatus of any one of examples 1 to 5, the plurality of removable storage device mounting slots arranged in pairs, each pair of the plurality of removable storage device mounting slots to receive a one of the plurality of storage devices.

EXAMPLE 11

The apparatus of example 10, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 12

The apparatus of example 11, each pair of the plurality of removable storage device mounting slots spaced apart from another pair of the plurality of removable storage device mounting slots a distance sufficient to robotically insert and remove the plurality of storage devices.

EXAMPLE 13

A system for a rack of a data center, comprising: a rack, comprising: a plurality of mounting brackets arranged to form at least one sled space; and a plurality of rack side multi-purpose connector modules (MPCMs) coupled to an optical fabric; and at least one sled, each of the at least one sleds comprising: a frame to couple to ones of the plurality of mounting brackets, the frame comprising a plurality of removable storage device mounting slots arranged to receive a plurality of storage devices; a substrate coupled to the frame; a sled side MPCM disposed on the substrate, the sled side MPCM arranged to couple to a corresponding one of the rack side MPCMs; and a plurality of storage device MPCMs disposed on the substrate, each of the plurality of storage device MPCMs coupled to the sled side MPCM and arranged to couple to a corresponding one of the plurality of storage devices to communicatively couple the plurality of removable storage devices to the optical fabric.

EXAMPLE 14

The system of example 13, each of the at least one sleds comprising a dual-mode optical network interface disposed on the substrate, the dual-mode optical network interface operably coupled to the MPCM and the storage device MPCMs.

EXAMPLE 15

The system of example 14, each of the at least one sleds comprising at least one storage resource processing circuit, the dual-mode optical network interface operably coupled to the storage device MPCMs via the at least one storage resource processing circuit.

EXAMPLE 16

The system of example 15, each of the at least one storage resource processing circuits comprising a first storage resource processing circuit and a second storage resource processing circuit, the dual-mode optical network interface operably coupled to a first subset of the storage device MPCMs via the first storage resource processing circuit and operably coupled to a second subset of the storage device MPCMs via the second storage resource processing circuit.

EXAMPLE 17

The system of example 16, each of the at least one sleds comprising the plurality of storage devices.

EXAMPLE 18

The system of any one of examples 13 to 17, each of the at least one sleds comprising a plurality of memory module sockets to receive a plurality of memory modules, each of the plurality of memory module sockets coupled to the sled side MPCM.

EXAMPLE 19

The system of example 18, each of the at least one sleds comprising the plurality of memory modules.

EXAMPLE 20

The system of any one of examples 13 to 17, the frame of each of the at least one sleds comprising mounting flanges disposed on lateral ends of the frame, the mounting flanges arranged to mechanically couple to ones of the plurality of mounting brackets to mechanically position the sled in a one of the at least one sled space.

EXAMPLE 21

The system of example 20, the plurality of mounting brackets and the mounting flanges of the at least one sled arranged such that the at least one sleds are to be robotically insertable and removable from the rack.

EXAMPLE 22

The system of any one of examples 13 to 17, the plurality of removable storage device mounting slots of each of the at least one sleds arranged in pairs, each pair of the plurality of removable storage device mounting slots to receive a one of the plurality of storage devices.

EXAMPLE 23

The system of example 22, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 24

The system of example 23, each pair of the plurality of removable storage device mounting slots spaced apart from another pair of the plurality of removable storage device mounting slots a distance sufficient to robotically insert and remove the plurality of storage devices.

EXAMPLE 25

An apparatus for a sled of a data center, comprising: a frame comprising a first portion and a second portion to mechanically couple to a removable storage device tray, the first and the second portion arranged to form mounting flanges to mechanically couple to a rack of a data center; the removable storage device tray comprising a plurality of removable storage device mounting slots arranged to receive a plurality of storage devices; a substrate coupled to the frame; a multi-purpose connector module (MPCM) disposed on the substrate, the MPCM arranged to couple to a corresponding connector module of the rack; a plurality of storage device MPCMs disposed on the substrate, each of the plurality of storage device MPCMs coupled to the MPCM arranged to couple to a corresponding one of the plurality of storage devices; and a dual-mode optical network interface disposed on the substrate, the dual-mode optical network interface to operably couple to the MPCM and the storage device MPCMs.

EXAMPLE 26

The apparatus of example 25, comprising at least one storage resource processing circuit, the dual-mode optical network interface operably coupled to the storage device MPCMs via the at least one storage resource processing circuit.

EXAMPLE 27

The apparatus of example 26, the at least one storage resource processing circuit comprising a first storage resource processing circuit and a second storage resource processing circuit, the dual-mode optical network interface operably coupled to a first subset of the storage device MPCMs via the first storage resource processing circuit and operably coupled to a second subset of the storage device MPCMs via the second storage resource processing circuit.

EXAMPLE 28

The apparatus of example 27, comprising the plurality of storage devices.

EXAMPLE 29

The apparatus of any one of examples 25 to 28, comprising a plurality of memory module sockets to receive a plurality of memory modules, each of the plurality of memory module sockets coupled to the MPCM.

EXAMPLE 30

The apparatus of example 29, comprising the plurality of memory modules.

EXAMPLE 31

The apparatus of any one of examples 25 to 28, the mounting flanges disposed at lateral ends of the frame.

EXAMPLE 32

The apparatus of example 31, the mounting flanges arranged such that the frame is to be robotically insertable and removable from the rack.

EXAMPLE 33

The apparatus of any one of examples 25 to 28, the plurality of removable storage device mounting slots arranged in pairs, each pair of the plurality of removable storage device mounting slots to receive a one of the plurality of storage devices.

EXAMPLE 34

The apparatus of example 33, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 35

The apparatus of example 34, each pair of the plurality of removable storage device mounting slots spaced apart from another pair of the plurality of removable storage device mounting slots a distance sufficient to robotically insert and remove the plurality of storage devices.

EXAMPLE 36

An apparatus for a sled of a data center, comprising: a frame to couple to a rack of a data center, the frame comprising a plurality of removable storage device mounting means arranged to receive a plurality of storage devices; a substrate coupled to the frame; a connector means disposed on the substrate, the connector means to couple to a corresponding connector means of the rack; and a plurality of storage device connector means disposed on the substrate, each of the plurality of storage device connector means to couple a one of the plurality of storage devices to the connector means.

EXAMPLE 37

The apparatus of example 36, comprising a dual-mode interface means disposed on the substrate, the dual-mode interface means operably coupled to the connector means and the storage device connector means.

EXAMPLE 38

The apparatus of example 37, comprising at least one storage resource control means, the dual-mode interface means operably coupled to the storage device connector means via the at least one storage resource control means.

EXAMPLE 39

The apparatus of example 38, the at least one storage resource control means comprising a first storage resource control means and a second storage resource control means, the dual-mode interface means operably coupled to a first subset of the storage device connector means via the first storage resource control means and operably coupled to a second subset of the storage device control means via the second storage resource control means.

EXAMPLE 40

The apparatus of example 39, comprising the plurality of storage devices.

EXAMPLE 41

The apparatus of any one of examples 36 to 40, comprising a plurality of memory module connector means to receive a plurality of memory modules, each of the plurality of memory module connector means coupled to the connector means.

EXAMPLE 42

The apparatus of example 41, comprising the plurality of memory modules.

EXAMPLE 43

The apparatus of any one of examples 36 to 40, the frame comprising mounting flanges disposed on lateral ends of the frame, the mounting flanges arranged to mechanically couple to mounting brackets of the rack.

EXAMPLE 44

The apparatus of example 43, the rack mounting flanges and the mounting brackets arranged such that the frame is capable of being robotically inserted and removed from the rack.

EXAMPLE 45

The apparatus of any one of examples 36 to 40, the plurality of removable storage device mounting means arranged in pairs, each pair of the plurality of removable storage device mounting means to receive a one of the plurality of storage devices.

EXAMPLE 46

The apparatus of example 45, a one of each pair of the plurality of removable storage device mounting means disposed on a lower portion of the frame and the other one of each pair of the plurality of removable storage device mounting means disposed on an upper portion of the frame to retain each of the plurality of storage devices vertically.

EXAMPLE 47

The apparatus of example 46, each pair of the plurality of removable storage device mounting means spaced apart from another pair of the plurality of removable storage device mounting means a distance sufficient to robotically insert and remove the plurality of storage devices.

What is claimed is:
1. A data center sled, comprising:
   a frame to couple to a rack of a data center, the frame comprising a plurality of removable storage device mounting slots arranged to receive a plurality of storage devices;
   a substrate coupled to the frame;
   a multi-purpose connector module (MPCM) disposed on the substrate, the MPCM arranged to couple to a corresponding connector module of the rack;
   a plurality of storage device MPCMs disposed on the substrate, each of the plurality of storage device MPCMs coupled to the MPCM arranged to couple to a corresponding one of the plurality of storage devices; and
   a dual-mode optical network interface disposed on the substrate, the dual-mode optical network interface operably coupled to the MPCM and the storage device MPCMs.

2. The data center sled of claim 1, comprising at least one storage resource processing circuit, the dual-mode optical network interface operably coupled to the storage device MPCMs via the at least one storage resource processing circuit.

3. The data center sled of claim 2, the at least one storage resource processing circuit comprising a first storage resource processing circuit and a second storage resource processing circuit, the dual-mode optical network interface operably coupled to a first subset of the storage device MPCMs via the first storage resource processing circuit and operably coupled to a second subset of the storage device MPCMs via the second storage resource processing circuit.

4. The data center sled of claim 3, comprising the plurality of storage devices.

5. The data center sled of claim 1, comprising a plurality of memory module sockets to receive a plurality of memory modules, each of the plurality of memory module sockets coupled to the MPCM.

6. The data center sled of claim 5, comprising the plurality of memory modules.

7. The data center sled of claim 1, the frame comprising mounting flanges disposed on lateral ends of the frame, the mounting flanges arranged to mechanically couple to mounting brackets of the rack.

8. The data center sled of claim 7, the rack mounting flanges and the mounting brackets arranged such that the frame is capable of being robotically inserted and removed from the rack.

9. The data center sled of claim 1, the plurality of removable storage device mounting slots arranged in pairs, each pair of the plurality of removable storage device mounting slots to receive a one of the plurality of storage devices.

10. The data center sled of claim 9, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

11. The data center sled of claim 10, each pair of the plurality of removable storage device mounting slots spaced apart from another pair of the plurality of removable storage device mounting slots a distance sufficient to robotically insert and remove the plurality of storage devices.

12. A data center rack, comprising:
   a plurality of mounting brackets arranged to form at least one sled space; and
   a plurality of rack side multi-purpose connector modules (MPCMs) coupled to an optical fabric; and
   at least one sled, each of the at least one sleds comprising:
      a frame to couple to ones of the plurality of mounting brackets, the frame comprising a plurality of removable storage device mounting slots arranged to receive a plurality of storage devices;
      a substrate coupled to the frame;
      a sled side MPCM disposed on the substrate, the sled side MPCM arranged to couple to a corresponding one of the rack side MPCMs; and
      a plurality of storage device MPCMs disposed on the substrate, each of the plurality of storage device MPCMs coupled to the sled side MPCM and arranged to couple to a corresponding one of the plurality of storage devices to communicatively couple the plurality of removable storage devices to the optical fabric.

13. The data center rack of claim 12, each of the at least one sleds comprising:

a dual-mode optical network interface disposed on the substrate, the dual-mode optical network interface operably coupled to the MPCM and the storage device MPCMs;

a first storage resource processing circuit, the dual-mode optical network interface operably coupled to a first subset of the storage device MPCMs via the first storage resource processing circuit; and a second storage resource processing circuit, the dual-mode optical network interface operably coupled operably coupled to a second subset of the storage device MPCMs via the second storage resource processing circuit.

14. The data center rack of claim 12, each of the at least one sleds comprising a plurality of memory module sockets to receive a plurality of memory modules, each of the plurality of memory module sockets coupled to the sled side MPCM.

15. The data center rack of claim 14, each of the at least one sleds comprising:
the plurality of storage devices; and
the plurality of memory modules.

16. The data center rack of claim 12, the frame of each of the at least one sleds comprising mounting flanges disposed on lateral ends of the frame, the mounting flanges arranged to mechanically couple to ones of the plurality of mounting brackets to mechanically position the sled in a one of the at least one sled space.

17. The data center rack of claim 16, the plurality of mounting brackets and the mounting flanges of the at least one sled arranged such that the at least one sleds are to be robotically insertable and removable from the rack.

18. The data center rack of claim 12, the plurality of removable storage device mounting slots of each of the at least one sleds arranged in pairs, each pair of the plurality of removable storage device mounting slots to receive a one of the plurality of storage devices.

19. The data center rack of claim 18, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

20. The data center rack of claim 19, each pair of the plurality of removable storage device mounting slots spaced apart from another pair of the plurality of removable storage device mounting slots a distance sufficient to robotically insert and remove the plurality of storage devices.

21. An apparatus for a sled of a data center, comprising:
a frame comprising a first portion and a second portion to mechanically couple to a removable storage device tray, the first and the second portion arranged to form mounting flanges to mechanically couple to a rack of a data center;
the removable storage device tray comprising a plurality of removable storage device mounting slots arranged to receive a plurality of storage devices;
a substrate coupled to the frame;
a multi-purpose connector module (MPCM) disposed on the substrate, the MPCM arranged to couple to a corresponding connector module of the rack;
a plurality of storage device MPCMs disposed on the substrate, each of the plurality of storage device MPCMs coupled to the MPCM arranged to couple to a corresponding one of the plurality of storage devices; and
a dual-mode optical network interface disposed on the substrate, the dual-mode optical network interface to operably couple to the MPCM and the storage device MPCMs.

22. The apparatus of claim 21, the at least one storage resource processing circuit comprising a first storage resource processing circuit and a second storage resource processing circuit, the dual-mode optical network interface operably coupled to a first subset of the storage device MPCMs via the first storage resource processing circuit and operably coupled to a second subset of the storage device MPCMs via the second storage resource processing circuit.

23. The apparatus of claim 21, comprising a plurality of memory module sockets to receive a plurality of memory modules, each of the plurality of memory module sockets coupled to the MPCM.

24. The apparatus of claim 21, the mounting flanges disposed at lateral ends of the frame and arranged such that the frame is to be robotically insertable and removable from the rack.

25. An apparatus for a sled of a data center, comprising:
a frame to couple to a rack of a data center, the frame comprising a plurality of removable storage device mounting means arranged to receive a plurality of storage devices;
a substrate coupled to the frame;
a connector means disposed on the substrate, the connector means to couple to a corresponding connector means of the rack;
a plurality of storage device connector means disposed on the substrate, each of the plurality of storage device connector means to couple a one of the plurality of storage devices to the connector means; and
a dual-mode interface means disposed on the substrate, the dual-mode interface means operably coupled to the connector means and the storage device connector means.

26. The apparatus of claim 25, comprising a first storage resource control means and a second storage resource control means, the dual-mode interface means operably coupled to a first subset of the storage device connector means via the first storage resource control means and operably coupled to a second subset of the storage device control means via the second storage resource control means.

27. The apparatus of claims 26, the plurality of removable storage device mounting means arranged in pairs, each pair of the plurality of removable storage device mounting means to receive a one of the plurality of storage devices, a one of each pair of the plurality of removable storage device mounting means disposed on a lower portion of the frame and the other one of each pair of the plurality of removable storage device mounting means disposed on an upper portion of the frame.

28. The apparatus of claim 25, the frame comprising mounting flanges disposed on lateral ends of the frame, the mounting flanges arranged to mechanically couple to mounting brackets of the rack and the rack mounting flanges and the mounting brackets arranged such that the frame is capable of being robotically inserted and removed from the rack.

* * * * *